Oct. 5, 1954 R. DOUSSAIN ET AL 2,690,810
AIRCRAFT PROPELLER
Filed July 15, 1948 3 Sheets-Sheet 1
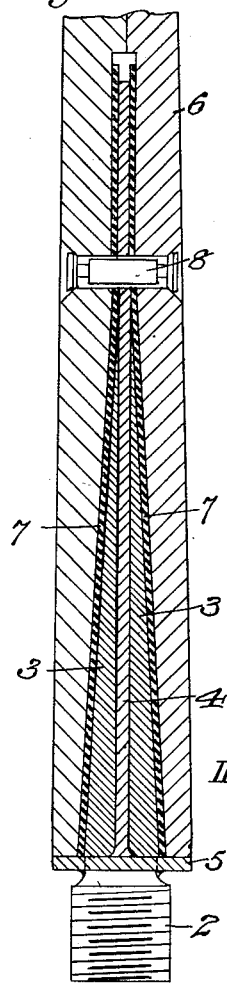
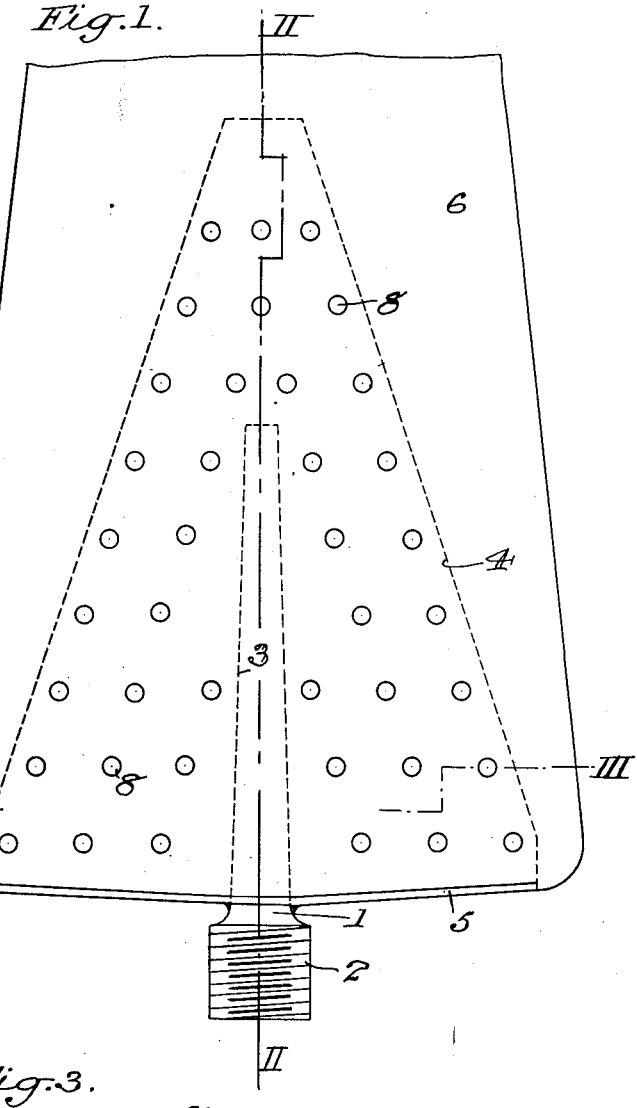
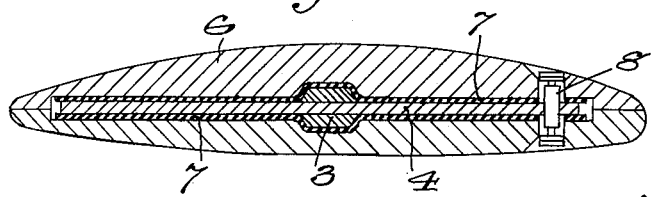
Inventors:
Robert Doussain
Robert Bousson and
Louis Perrier
by Brown & Seward
Attorneys

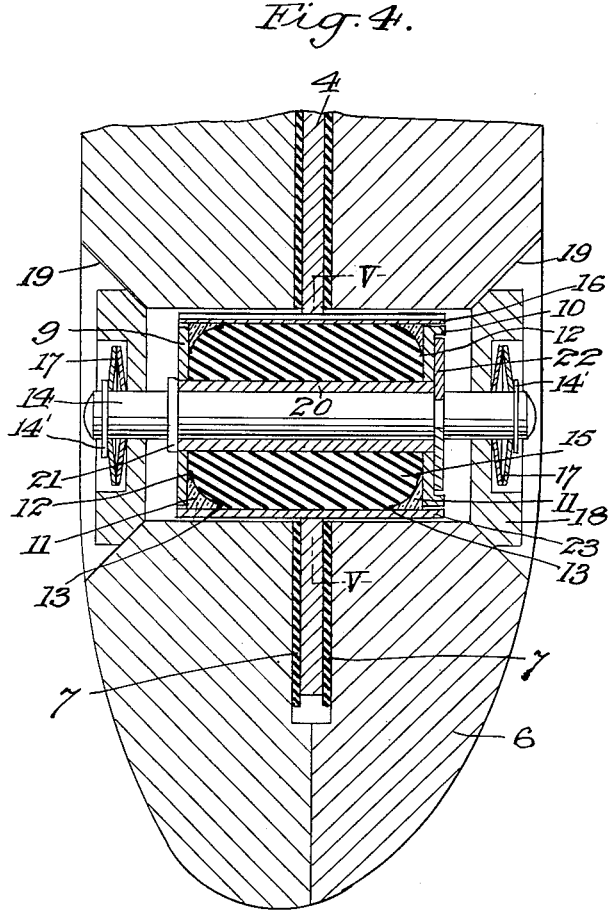
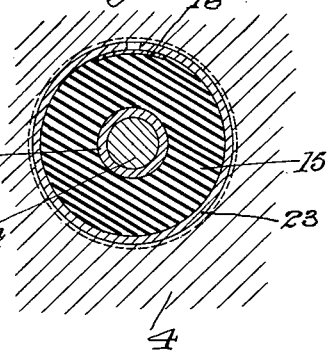

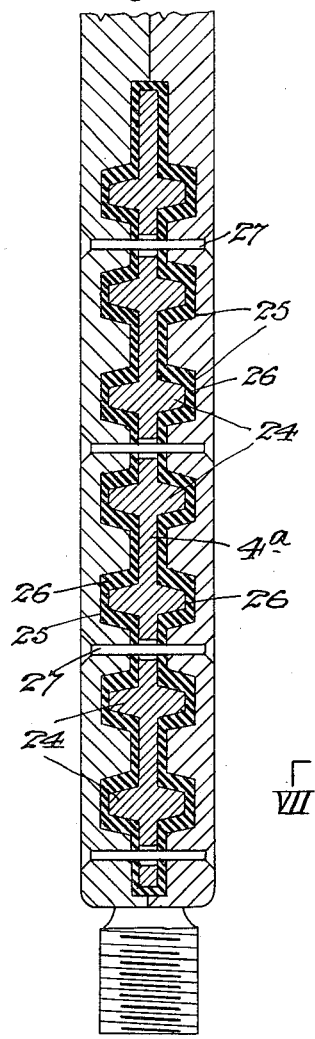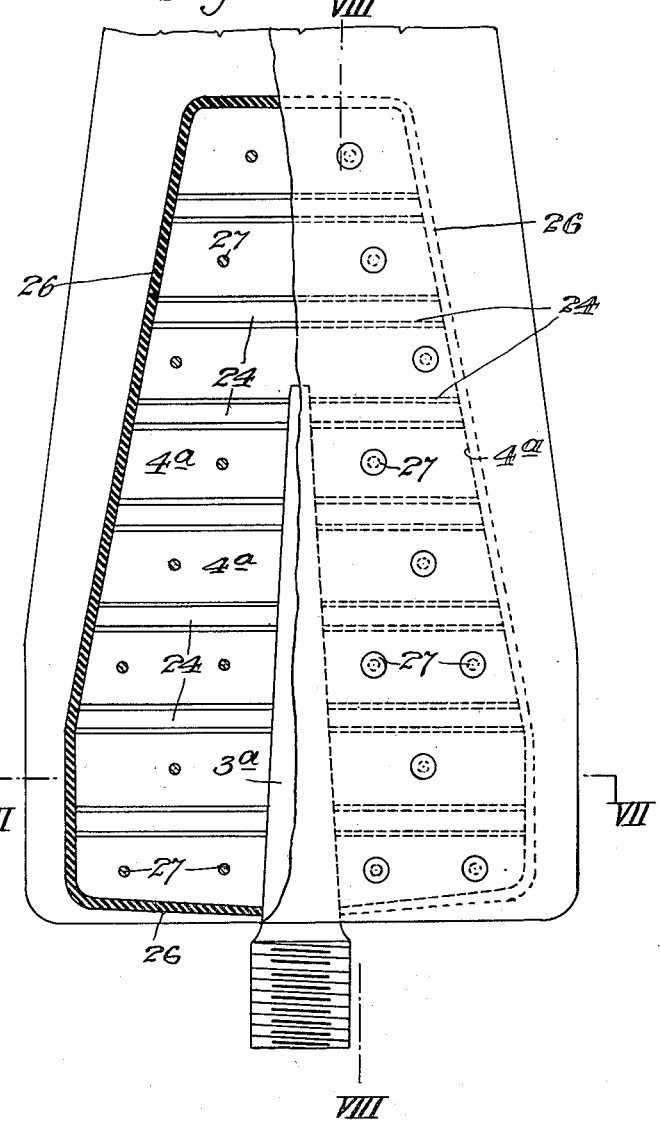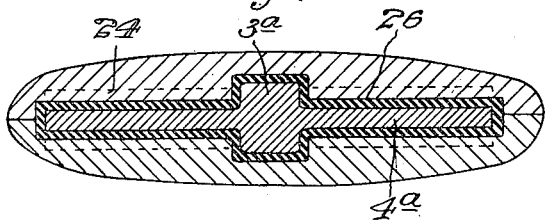

Patented Oct. 5, 1954

2,690,810

UNITED STATES PATENT OFFICE 2,690,810

AIRCRAFT PROPELLER

Robert Doussain, Vitry-sur-Seine, Robert Bousson, Lyon, and Louis Perrier, Arnouville-les-Gonesses, France, assignors to Office National d'Etudes et de Recherches Aeronautiques, Paris, France, a company of France Application July 15, 1948, Serial No. 38,804

Claims priority, application France July 31, 1947

1 Claim. (Cl. 170—159)

The present invention relates to aircraft propellers and more particularly to the construction of propeller blades and their fastening on the hub.

The invention more particularly relates to variable pitch propellers.

It is generally known that with the extension of the use of variable pitch propellers, the propellers made of natural wood have been practically abandoned and have been substituted by metallic propellers.

The manufacture of blades made of natural wood or of synthetic resins for variable pitch propellers has not given satisfactory results because of the necessity to increase the cross-section of the blade root which involves drawbacks from the point of view of aerodynamics. Furthermore, it is particularly difficult to secure the roots of the blades in metallic sockets, on account of the wear and play appearing between wood and metal. On the other hand, metallic propeller blades are heavier than wooden blades and involve great manufacturing difficulties and increase the costs.

The object of the present invention is to eliminate all these drawbacks and to make possible the manufacture of blades constructed so as to allow a simple, practical and reliable fastening thereof on hubs of any structure, and more particularly on hubs with removable blades, and this without involving an increase of the cross-section of the blade roots.

According to one feature of the invention the blade comprises a wooden leaf, an inner metal core plate engaged in the root of the said wooden leaf, a metal sole rigid with said core, a packing of resilient material interposed between the metal core and the wooden blade root, and connecting means ensuring, on the one hand, the transmission of stresses from the leaf to its core, and, on the other hand, ensuring a resilient fastening of the leaf on the core so as to allow a certain play sufficient to absorb possible relative deformations of different parts of the assembly.

According to another feature of the invention, the assembly of different parts of the blade is performed by a plurality of connecting elements, the means being provided to automatically compensate the play of said connecting elements, so as to ensure permanently a uniform distribution of stresses. The inner core is preferably made of steel and is entirely sunk inside of the leaf to which it is fastened by a great number of connecting elements, the sole of the blade, preferably also made of steel, being so dimensioned as to support all the stresses. The blade carrying member has a portion of a generally cylindrical shape, for instance, and which forms the blade's foot, properly speaking; a stem extending from this foot and engaging itself into the blade has, for instance, a generally tapering shape secured to the inner core made of a large trapezoidal plate and reinforced against torque by a rib rigid with the blade's sole. The wooden part of the blade is cushioned on the inner core by means of a packing of natural or synthetic rubber and is secured to the same by a great number of connecting elements.

According to this feature of the invention, the stresses developed in the blade are uniformly transmitted to an intermediate core member, the latter being made rigid with the hub.

The manufacture of blades according to the invention is very simple and facilitates obtaining favorable aerodynamic cross-sections, including the root sections.

According to another embodiment of the invention, the inner core plate is provided with a certain number of cross-ribs, whilst the wooden part of the blade is provided, in its turn, with corresponding grooves coated with rubber or with a similar material. According to this device, the centrifugal forces are taken by the cross-ribs and the rubber packing, the wooden part being in this case bored with only a restricted number of small holes traversed by simple rivets.

In this embodiment, the core plate can be made of some light metal, such as hard aluminium, the cross-ribs being machined in the solid plate. It will be readily understood that these cross-ribs will give the inner core plate the necessary rigidity against torque, thus the sole-rib of the former embodiment of the invention may be eliminated.

The invention may be carried into practice in various ways, but two alternative constructions according to this invention are illustrated by way of example in the accompanying drawings, in which:

Fig. 1 is an elevational view of the blade assembly, showing only one connecting element, Fig. 2 is a longitudinal cross-section of the blade on the line II—II of Fig. 1, Fig. 3 is a transverse cross-section on the line III—III of Fig. 1, Fig. 4 shows a detail of a connecting element on a larger scale, Fig. 5 shows one of these connecting elements in cross-section on the line V—V of Fig. 4, Fig. 6 is an elevational view of the blade assembly according to an alternative embodiment of the invention, parts being broken away, Fig. 7 is a transversal cross-section on the line VII—VII of Fig. 6, Fig. 8 is a longitudinal cross-section on the line VIII—VIII of Fig. 6.

Referring first to Figs. 1 to 5 the blade-carrying member comprises a metallic stem 1 extended by a portion 2, which forms, properly speaking, the foot of the blade, and having a tapering portion 3 engaged in the root of the blade. This tapered stem 3 bears a trapezoidal metallic anchor plate 4, the rim of which, lying level with the blade's root, is reinforced by a rib 5 welded directly to the stem 1. The assembly of members 1, 4 and 5 forms thus a rigid unit. This assembly, except the foot 2, is sunk inside of the wooden portion 6 of the blade with an intermediate rubber packing 7. The assembly is carried out by means of assembling elements such as stud-bolts 8, which are preferably constructed so as to compensate the play and to absorb locally the stresses due to the forces of inertia and to the aerodynamic loads, said bolts being indicated generally in Figs. 1, 2 and 3.

Referring to Figs. 4 and 5 the details of these stud-bolts or connecting elements will be made clear. In the example represented in the drawings each stud-bolt comprises two beveled members 18 mounted on a central axle 14 and bearing on beveled seats 19 of the same conicity as beveled members 18 and adjacent to a hole bored through all the members which are to be connected together. A resilient device constituted, for instance, by two couples of springy washers 17, retained on the axle 14 by means of locking rings 14', ensures a practically constant compressive stress, for variations of yielding deflections of said springy washers, resulting, for instance, from differences in elongation coefficients of various materials of the blade.

The axle 14 transmits the centrifugal forces to a cylindrical barrel 23 by means of a natural or synthetic rubber muff 15. The rubber is caused to adhere with an initial tension or preferably submitted to an initial compression by an appropriate device allowing displacements normal to the axis 14. This device comprises two washers 9 and 10 rigidly set on the axle 14, by means of a sleeve 20, an abutment 21, and a ring 22 made of two pieces and engaging by its inner rim into a circular groove cut in the axle 14. The packings 11 thinned at their rims 12 and 13 prevent the rubber from creeping in the corners and maintain the desired shape of the rubber muff 15. The outer barrel 23 is preferably made of a split cylinder, a segment blade 16 preventing the rubber from being entangled in the slit. The core plate 4 is made rigid with the barrel 23 under effect of the pressure produced by the resilient muff 15. It will be readily understood that the assembly of the axle 14 and of the barrel 23 can move axially in overcoming the resistance of the resilient washers 17, whilst the radial displacements are allowed by the elasticity of the muff 15. A certain amount of play is thus provided between the washers 9 and 10, on the one hand, and the barrel 23, on the other hand. A permanently uniform distribution of stresses is obtained, on the one hand, due to the rubber packings 7 interposed between the inner core plate and the wood and which may have, for instance, a thickness of a few millimeters, and, on the other hand, due to the stud-bolts of a special construction described hereabove.

The resilient packing 7 is preferably made of two rubber sheets caused to adhere or vulcanise, with a certain initial tension, both to the wood blade and to the metal core, the rims of the rubber sheets having freedom to expand under the compressive stresses, due to free room provided in the wood around the rim of the inner core plate.

In the example represented in Figs. 6 to 8 the inner metal core plate 4a is provided with a series of cross-ribs 24 engaging in the corresponding grooves 25 cut in the wooden portion. The free room left between the metal plate and the wooden part is filled by a substance 26 such as natural or synthetic rubber caused to adhere or glue to both members. The assembly of the two halves of the blade with the inner core plate is carried out by means of a certain number of rivets 27 permitting the compressive stressing of the rubber filling the free room between the wood and the metal. The centrifugal forces are thus transmitted to the inner core, and consequently also to the blade's foot, by means of the ribs 24; the latter ribs serve also to reinforce the core plate against the torque. The resilient packing 26 compensates unequal deformations of wood and metal.

In the preceding description the material of which the blade is made is indifferently called "wood"; as it has been already mentioned, this general term includes: natural wood, conditioned wood (for instance impregnated with any desired substances) and artificial wood, i. e. a plastic material of which wood constitutes the filling.

Furthermore, it is possible to manufacture the blade itself in several parts, for instance the root of an artificial or conditioned wood, and the remainder of a natural wood, etc., without thereby departing from the scope of the present invention.

It is obvious that the invention is not at all limited to the examples described and represented in the drawings, and that the shape of different members, their relative sizes, the material of which they are made, etc., may be varied, without departing from the scope of the present invention.

We claim:

An aircraft propeller comprising a blade and a blade carrying member, an anchor plate forming an extension of said blade carrying member, a recess in the root of the blade for receiving said anchor plate, a resilient packing interposed between said anchor plate and said blade, and a plurality of assembling elements extending through said blade and said anchor plate to secure the latter within said recess thereby allowing slight radial and axial displacements of said blade with respect to the propeller axis, said assembling elements being constituted by stud-bolts comprising each an axle, two beveled discs mounted thereon and bearing on beveled seats of the same conicity adjacent to a bore into which said stud-bolt is extended, at least one resilient member interposed between the discs and the ends of the axle and allowing a longitudinal displacement of the assembly along its axis, a radially yielding barrel mounted on the axle in longitudinally rigid connection therewith, and a resilient muff interposed between the axle and the barrel so as to leave to the assembly a certain freedom to move normally to the axis of said stud-bolt.

(References on following page)

References Cited in the file of this patent

UNITED STATES PATENTS

| Number | Name | Date |
|---|---|---|
| 775,728 | Miller | Nov. 22, 1904 |
| 1,846,256 | Havill | Feb. 23, 1932 |
| 1,967,735 | Bendix | July 24, 1934 |
| 2,115,454 | Berliner | Apr. 26, 1938 |
| 2,115,653 | Snyder | Apr. 26, 1938 |
| 2,235,605 | Bugatti | Mar. 18, 1941 |
| 2,240,873 | Thomas | May 6, 1941 |
| 2,254,821 | Haw | Sept. 2, 1941 |
| 2,278,900 | Sensenich | Apr. 7, 1942 |
| 2,336,012 | Hackethal | Dec. 7, 1943 |
| 2,340,133 | Martin | Jan. 25, 1944 |
| 2,400,649 | Larsen | May 21, 1946 |
| 2,428,970 | Hardy | Oct. 14, 1947 |
| 2,465,007 | Bragdon | Mar. 22, 1949 |

FOREIGN PATENTS

| Number | Country | Date |
|---|---|---|
| 126,105 | Great Britain | Apr. 4, 1919 |
| 508,146 | Great Britain | June 27, 1939 |
| 760,098 | France | Dec. 6, 1933 |
| 861,292 | France | Oct. 22, 1940 |